Figure 1:
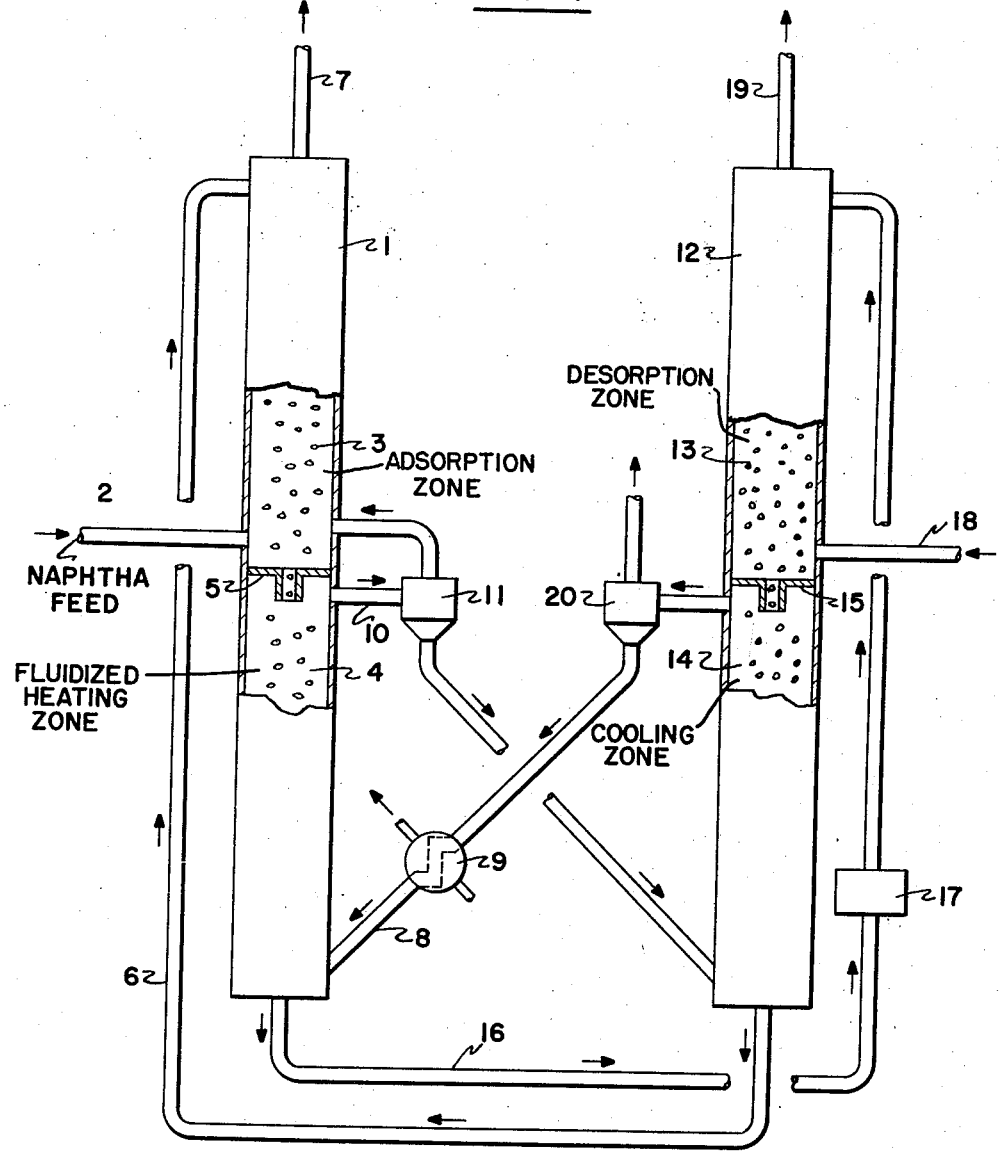

Sept. 15, 1959  C. E. JAHNIG  2,904,507
FLUIDIZED MOLECULAR SIEVE PROCESS
Filed July 11, 1957  2 Sheets-Sheet 1

Charles E. Jahnig  Inventor
By W. O. T. Heilman  Attorney

Charles E. Jahnig  Inventor
By W. D. T Heilman  Attorney

United States Patent Office 2,904,507
Patented Sept. 15, 1959

2,904,507
FLUIDIZED MOLECULAR SIEVE PROCESS

Charles E. Jahnig, Rumson, N.J., assignor to Esso Research and Engineering Company, a corporation of Delaware Application July 11, 1957, Serial No. 671,252

9 Claims. (Cl. 208—310)

The present invention is concerned with an improved process for the separation and segregation of straight chain hydrocarbons from mixtures comprising branched chain hydrocarbons and/or cyclic or aromatic hydrocarbons. The invention is more particularly concerned with an efficient fluidized solids thermal method for operating a molecular sieve separation process, including both the adsorption stage and the desorption stage.

In accordance with the present operation heat exchange between an adsorbent and fines is secured in a countercurrent fluidized operation. A specific adaptation of the present invention is to adsorb constituents from a liquid by means of molecular sieve, and to thereafter remove undesirable liquid particles from the adsorbent by countercurrent heat exchange with inert finer materials.

It has been known for some time that certain zeolites, both naturally occurring and synthetic, have the property of separating normal from isomeric branch chained hydrocarbons, as well as from cyclic and aromatic admixtures. These zeolites have crystalline structures containing a large number of small cavities interconnected by a number of still smaller holes or pores, the latter being of exceptional uniformity of size. Only molecules small enough to enter the pores can be adsorbed. The pores may vary in diameter from 3-5 Angstrom units to 12-15 or more, but is is a property of these zeolites, or molecular sieves, that for a particular sieve the pores are of substantially uniform size.

The scientific and patent literature contains numerous references to the adsorbing action of natural and synthetic zeolites. Among the natural zeolites having this sieve property may be mentioned chabazites and analcite. A synthetic zeolite with molecular sieve properties is described in U.S. Patent No. 2,442,191. Zeolites vary somewhat in composition, but generally contain silica, aluminum, oxygen, and an alkali and/or alkaline earth element, e.g., sodium and/or calcium, magnesium, etc. Analcite has the empirical formula $NaAlSi_2O_6 \cdot H_2O$. Barrer (U.S. Patent No. 2,306,610) teaches that all or part of the sodium is replaceable by calcium to yield, on dehydration, a molecular sieve having the formula $(CaNa_2)Al_2Si_4O_{12} \cdot 2H_2O$. Black (U.S. Patent No. 2,522,426) describes a synthetic molecular sieve having the formula $4CaO \cdot Al_2O_3 \cdot 4SiO_2$. A large number of other naturally-occurring zeolites having molecular sieve activity, i.e., the ability to adsorb a straight-chain hydrocarbon and exclude the branch chain isomers, are described in an article "Molecular Sieve Action of Solids" appearing in Quarterly Reviews, vol. III, pp. 292–330 (1949), and published by the Chemical Society (London).

The separation of normal from branch chain or aromatic hydrocarbons or mixtures, either for the purpose of enriching the mixture in branch chain, cyclic or aromatic components, or for isolating and recovering of the normal isomer, has become increasingly important in industry. Thus, in the preparation of high octane fuels, the presence of normal paraffins degrades the octane rating. On the other hand, in the manufacture of synthetic detergents such as alkyl aryl sulfonates, a straight chain nuclear alkyl substituent makes for better detergency characteristics than a branch chained substituent of the same number of carbon atoms. Many other examples may be cited.

Desorption of material from molecular sieves may be brought about (a) by reducing the partial pressure of the adsorbed material in the vapor surrounding the sieve by lowering the total pressure of the system or by purging with a suitable inert gas and (b) by heating the sieve, and (c) by displacing with a different adsorbed material such as water, or propylene.

In most cases, the amount of material which can be removed at low temperatures by a practical reduction in partial pressure is very small. For this reason, desorption is generally carried out at a temperature considerably higher than that used in the adsorption step. After desorption, heat must be removed from the sieve to bring it back to adsorption temperature. The heat should be recovered and reused to minimize the overall heat requirements of the process. At the same time, heat exchange surface must be minimized from a cost standpoint.

In fluid or moving bed sieve adsorption using thermal desorption, a large amount of solid adsorbent must be heated and cooled through a large temperature difference. This imposes a tremendous heat load, and efficient heat recovery is necessary if the process is to be practical. This high heat load, and the low temperature difference driving force would result in unreasonably large heat exchangers if indirect heat transfer were used. These problems are overcome in the present invention by exchanging heat by direct contact between two streams of solids particles of different sizes or density.

In accordance with the present invention, an efficient operation is secured by heat exchange of the large adsorbent particles with upflowing inert finer solids. The invention is particularly adapted for use in an operation wherein molecular sieves are employed to adsorb paraffinic type constituents from a liquid feed. Normally, in this type of operation, the adsorbent particles retain a film of liquid feed at the end of the adsorption step, and it is essential that this liquid feed by removed from the sieve prior to desorption of the adsorbed normal paraffinic type constituents. In accordance with the present process this is readily and effectively accomplished.

Figure 2:
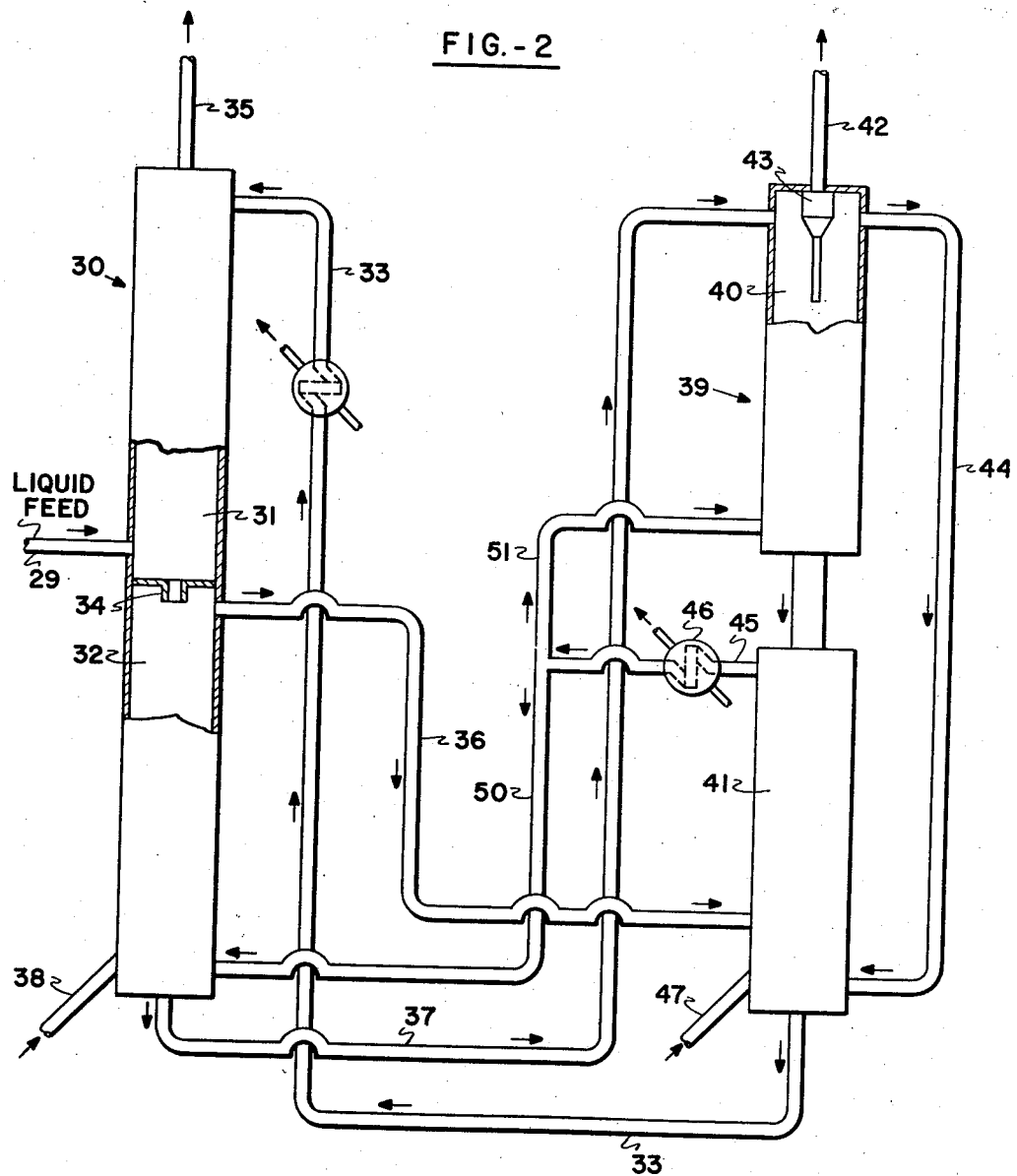

The invention may be readily understood by reference to the drawings illustrating embodiments of the same. Fig. 1 illustrates an operation wherein desorption is accomplished by the use of propylene, while Fig. 2 illustrates an operation directed specifically to thermal desorption.

For purposes of description, it is assumed that adsorption is carried out at a temperature of about 250° F. and that desorption is conducted at a temperature of about 350° F. or higher.

Referring specifically to the drawing, a liquid feed stream comprising normal and non-normal paraffins is introduced into an intermediate point of reaction vessel 1 by means of feed line 2. Reaction vessel 1 comprises an upper area 3 and a lower area 4. Suitable means 5 are provided to separate area 3 from area 4 so as not to permit the downflowing of liquid feed from 3 to 4 but to permit the passage of sieve particles from area 3 to 4. This may be secured by blowing inert or other gas upwardly through the passages of means 5. This gas may be feed vapors from zone 4. Or pressure differences can be adjusted so that a small amount of liquid stripping agent is made to flow up. This can be, for example, a recycle normal paraffin product. Other engineering means may also be employed so as to secure this desired operation (as by draining on a screen etc.).

The feed stream introduced by means of line 2 flows upwardly in area 3 and countercurrently contacts downflowing adsorbent such as molecular sieves which are introduced into the top of area 3 by means of line 6. Unadsorbed constituents are removed from the top of area 3 by means of line 7. For purposes of description and in accordance with the preferred adaptation of the present process, the operation in area 3 comprises a liquid solids contacting process. The sieves containing adsorbed thereon desirable constituents as well as having thereon a film of liquid feed material pass through means 5 into the top of area 4. Area 4 is suitably aerated by known means to secure a fluidized solids operation. The sieve materials pass downwardly in area 4 and more or less countercurrently contact upflowing heated finer inert solids which are introduced into the bottom of area 4 by means of line 8. These solids may be heated to the desired temperature prior to introduction into zone 4 by means of heater 9. Sufficient mixing is maintained in zone 4 to avoid zones of wet caked solids. These inert solids heat the sieve particles as they flow downwardly in zone 4 to a temperature in the range from about 275° to 350° F., thereby causing the undesirable liquid film on the sieve to be vaporized. The fluidized inert fine particles are withdrawn from the top of area 4 by means of line 10, pass through a separator 11 and then introduced into the bottom of reaction vessel 12. Reaction vessel 12 comprises an upper zone 13 and a lower area 14. A pressure drop across restriction means 15 prevents the passage of inert finer particles from zone 14 up to area 13, but permits the passage of sieve particles down from area 13 to area 14.

The large sieve particles removed from the bottom of area 4 by means of line 16 are passed to the top of area 13. These sieve particles may be heated to an elevated temperature, if desired, as for example, to about 400° to 600° F. by means of heater 17. The sieve particles flow downwardly in zone 13 and are desorbed. In some operations, it is preferred that a desorbing gas, as for example, propylene or hydrogen be introduced into the bottom of area 13 by means of line 18. The normal paraffins are withdrawn from the top of area 13 by means of line 19 along with added gas which may be introduced by means of line 18.

The sieve particles pass down through area 14 wherein they contact upflowing fine inert particles and are cooled by heat exchange with them. Relatively cool sieve particles are withdrawn from the bottom of area 14 by means of line 6 and introduced into the top of area 3. Generally, these sieve particles are at a temperature in the range from 150° to 250° F. The finer inert solids are withdrawn from the top of area 14, pass through a separator 20 and then introduced into the bottom of area 4 as hereinbefore described. Exchanger 9 supplies supplemental heat, as required for heat balance.

Referring specifically to Fig. 2, a liquid feed is introduced by means of line 29 into a reaction vessel 30 comprising an upper area 31 and a lower area 32. For purposes of description, it is assumed that the temperature in upper area 31 is about 100° F. The feed flows upwardly in area 31 and countercurrently contacts an adsorbent comprising molecular sieves which is introduced into the top of area 31 by means of line 33. Normal paraffins are adsorbed on the sieve which pass downwardly into the top of area 32 through means 34 adapted to permit the downflow of the sieve and to prevent the downflow of liquid material. A normal paraffin-free liquid product is withdrawn from the top of area 31 by means of line 35 and handled as desired.

Area 32 is maintained at a temperature of about 250° F. which is designed to vaporize the film of liquid from the molecular sieve, but not to desorb any of the adsorbed paraffins from the sieve. This is secured by the introduction of hot fines into the lower area of area 32 by means of line 50 secured in a manner as hereinafter described. The fines, together with the hot sieve, which is free of the film of liquid feed, are removed from the bottom of area 32 by means of line 37. The sieve in area 32 is maintained in a fluidized condition by means of a fluidizing gas which is introduced by means of line 38. This fluidizing gas may comprise any suitable gas, such as nitrogen, air and the like.

The sieve particles, together with fines, are passed into a reaction zone 39 comprising an upper area 40 and a lower area 41. The temperature at the top of area 40 is about 250° F., while the temperature at the bottom of zone 40 is about 600° F. Thus the normal paraffins will be removed from the sieve and taken overhead from zone 40 by means of line 42 and handled as desired. Fine sieve materials are removed by means of a separator 43 from the overhead product. These fines are passed downwardly by means of line 44 to the bottom of lower area 41. The hot sieve free of adsorbed material is passed into the top of area 41 and heat exchanged with the upflowing fines. The fines are removed from the top of area 41 by means of line 45. Additional heat may be added by means of heater 46. A portion of the fines are introduced into the bottom of area 32 and a portion into the bottom of area 40. The cooled sieve is removed from the bottom of area 41 at a temperature of about 250° F. by means of line 33 and recycled to the top of area 31. A purge gas may be introduced into the bottom of area 41 by means of line 47.

What is claimed is:

1. In a process wherein straight chain hydrocarbons are removed from a feed stream containing the same by means of zeolitic molecular sieve adsorbents, the improvement which comprises introducing the liquid feed stream into the bottom of an initial adsorption zone, introducing solid adsorbents into the top of said initial desorption zone, countercurrently contacting the upflowing stream with downflowing solids, withdrawing the feed stream free of straight chain hydrocarbons from the top of said initial adsorption zone, and the solids containing adsorbed constituents and a liquid feed film thereon from the bottom of said initial adsorption zone, fluidizing said adsorbents in a secondary zone and countercurrently contacting said fluidized solids with a heated phase of upflowing fines, said fines being more comminuted than said adsorbent particles, in order to raise the temperature of said solids sufficiently to remove therefrom said film of feed material, thereafter passing said adsorbent freed from said film of feed material to a desorption zone and desorbing straight chain hydrocarbons from said adsorbent at elevated temperatures.

2. Process as defined by claim 1 wherein the temperature of said adsorbents in said secondary zone is raised to about 250° to 300° F.

3. Process as defined by claim 2 wherein said liquid feed comprises a naphtha feed.

4. Process as defined by claim 3 wherein the temperature of said adsorbents after removal from said secondary zone is raised to about 600° F. whereby said adsorbed constituents are removed from said adsorbents.

5. Process as defined by claim 3 wherein said adsorbed constituents are removed from said adsorbents in a tertiary zone by means of a stripping gas.

6. Process as defined by claim 4 wherein said adsorbent removed from said secondary zone is heated in a tertiary zone by means of upflowing heated fines.

7. An integrated operation for the removal of straight chain hydrocarbons from a liquid feed stream containing the same which comprises introducing feed containing straight chain hydrocarbons into the bottom of an initial adsorption zone, introducing zeolitic molecular sieves into the top of said initial adsorption zone, countercurrently contacting upflowing liquid with downflowing sieves in said initial zone, whereby straight chain hydrocarbons are adsorbed on said molecular sieves, withdrawing a feed stream free of straight chain hydrocarbons from the top of said initial zone, withdrawing molecular sieves from the bottom of said initial zone which contains thereon a liquid film of said feed, passing said molecular sieves into the top of a secondary zone, fluidizing said sieves in said secondary zone by means of a fluidizing gas introduced into the bottom of said secondary zone, countercurrently contacting said downflowing fluidized molecular sieves with upflowing finer heated fines, whereby the temperature of said sieves is raised to about 250° to 300° F. and the liquid film removed from said sieves, removing fines from the top of said secondary zone and introducing the same into the bottom of a fourth zone, introducing said sieves withdrawn from the bottom of said secondary zone into the top of a tertiary zone, countercurrently contacting fluidized downflowing sieves in said tertiary zone with upflowing fluidized heated fines whereby the temperature of said sieves is raised to about 500° to 650° F., and whereby said adsorbed materials are removed therefrom, removing said adsorbed materials from the top of said tertiary zone, removing said fines from the top of said tertiary zone and introducing the same into the bottom of a fourth zone along with fines removed from the top of said secondary zone, introducing said sieves removed from the bottom of said tertiary zone into the top of said fourth zone, countercurrently contacting said sieves in said fourth zone with upflowing fluidized fines whereby said sieves are cooled and said fines are heated, withdrawing said sieves from the bottom of said fourth zone and introducing the same into the top of said initial zone, withdrawing fines from the top of said fourth zone and introducing a portion of said fines into the bottom of said secondary zone and a portion of said fines into the bottom of said tertiary zone.

8. Process as defined by claim 7 wherein said fines removed from the top of said fourth zone are heated before introducing the same into said secondary zone and said tertiary zone.

9. Process as defined by claim 8 wherein said feed comprises a naphtha feed boiling in the gasoline boiling range.

References Cited in the file of this patent
UNITED STATES PATENTS

| | | |
|---|---|---|
| 2,631,727 | Cichelli | Mar. 17, 1953 |
| 2,793,713 | Fritz et al. | May 28, 1957 |
| 2,818,455 | Ballard et al. | Dec. 31, 1957 |